VALENTINE & STEVENS.
Clothes-Line Reel.
No. 84,919.
Patented Dec. 15, 1868.
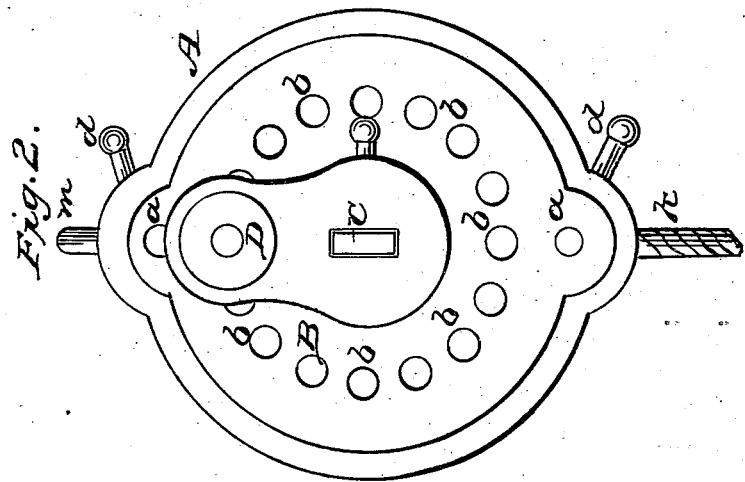
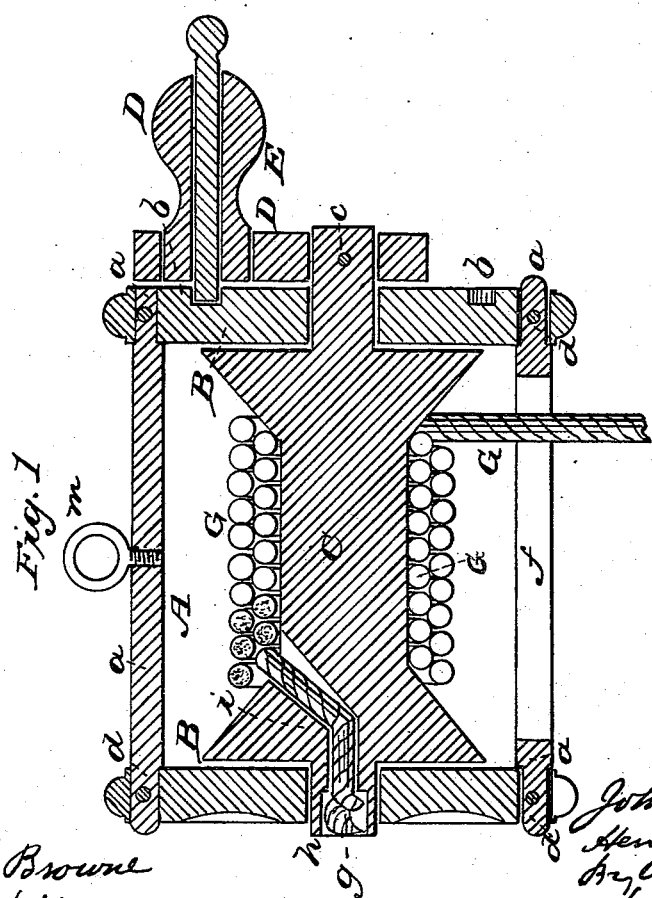

JOHN VALENTINE AND HENRY B. STEVENS, OF BUFFALO, NEW YORK.

Letters Patent No. 84,919, dated December 15, 1868.

IMPROVED CLOTHES-LINE REEL.

The Schedule referred to in these Letters Patent and making part of the same.

*To all whom it may concern:*

Be it known that we, JOHN VALENTINE and HENRY B. STEVENS, of Buffalo, in the county of Erie, and State of New York, have invented an Improved Reel for Clothes-Lines, and similar uses; and we do hereby declare that the following is a full and exact description thereof, reference being had to the accompanying drawings, making part of this specification—

Figure 1 being a central longitudinal section of the reel;

Figure 2, an end view thereof.

Like letters denote corresponding parts in both figures.

Our invention consists in an improved portable reel, having the line, or cord, with its spool thereon, enclosed in a close case.

Its peculiarities of construction and operation are substantially as follows:

The periphery, A, of the case, is made of sheet-metal, or other suitable material, its ends fitting into grooves in the two heads, B B, which may be of wood. To join the parts together, two bars, *a a*, may extend from head to head, having tenons extending through the heads, as shown, held therein by pins, *d d*. Any equivalent construction may be employed.

A spool, C, is located inside, being provided with journals, *c h*, which turn in bearings of the heads, B B, of the case. On this spool the line or cord, G, is wound.

One of the journals, *h*, of the spool has an aperture, *i*, extending from its outer end directly inward a suitable distance, and then obliquely outward to the periphery of the spool, substantially as shown in fig. 1. Through this aperture the cord is threaded, being held from drawing through by a knot, *g*, or its equivalent, at the end. Thus, the cord can be inserted or taken out of the reel at any time, without taking the case apart.

The outer end of the cord may terminate in a loop, *k*, for attaching to any fastening. The cord extends out through a mouth, or aperture, *f*, in one side of the periphery of the case, preferably through one of the bars *a* thereof. This mouth is oblong, of sufficient length to allow the cord to wind upon and unwind from all parts of the spool, directly inward and outward.

One journal, *c*, of the spool projects outward through the head B of the case, and has a crank, D, secured to it, for winding and unwinding the cord on the spool.

Through the centre of the crank-handle a pin, E passes, being allowed to slide in and out, and a set of concentric holes, *b b*, is made in the head, B, of the case, so situated as to exactly receive the pin E when brought round opposite to any one of them. By pushing the pin into any one of these holes the spool is prevented from unwinding any further.

A staple or hook, *m*, is attached to the reel-case at the periphery, opposite to the mouth where the cord runs out.

In using the reel, the loop *l* is secured to a hook, or other attachment, on a post, fence, or other place of support. The reel is then carried to the next point of support, the spool being left free to turn, thus paying out the cord. When the reel is brought to the last point of support, the staple *m* is secured thereto, and then the crank D is turned, so as to wind up the cord, till it is sufficiently taut, and then the pin E is inserted in a hole, *b*, thereby holding the cord stretched. If at any time the cord slackens, the crank is turned again till the cord is taut, and then it is again secured.

When the use of the cord is over for the time, the reel is unfastened and the cord is wound up inside thereof by the crank, and thus fully protected from the weather, wear, and dirt, it is wound in the reel-case.

The materials and outline of the reel-case may be varied at pleasure, the substantial features of the invention, as above set forth, being retained.

What we claim as our invention, and desire to secure by Letters Patent, is—

The perforated spool-journal *h*, substantially as and for the purpose herein specified.

Also, a reel, composed substantially of the following parts: The periphery A, heads B B, bars *a a*, serving both to connect the other parts and to receive the oblong mouth *f*, and loop or staple *m*, and the locking-pin E, in the crank-handle, and holding in the concentric holes *b b*, as herein specified.

The above specification of our improved reel for clothes-lines, and other similar uses, signed by us, this 26th day of December, 1867.

JOHN VALENTINE.
HENRY B. STEVENS.

Witnesses:
CHARLES SMITH,
AVERY WILLIAMS.